(12) United States Patent
Dalla Vecchia et al.

(10) Patent No.: US 11,353,213 B2
(45) Date of Patent: Jun. 7, 2022

(54) TEMPERATURE SENSOR FOR GAS BURNER AND ASSEMBLY CONSISTING OF SUCH SENSOR AND BURNER

(71) Applicant: POLIDORO S.P.A., Schio (IT)

(72) Inventors: Laura Dalla Vecchia, Santorso (IT); Stefano Dalla Vecchia, Santorso (IT)

(73) Assignee: POLIDORO S.P.A., Schio (IT)

( * ) Notice: Subject to any disclaimer, the term of this patent is extended or adjusted under 35 U.S.C. 154(b) by 0 days.

(21) Appl. No.: 17/437,473

(22) PCT Filed: Mar. 3, 2020

(86) PCT No.: PCT/IB2020/051798
§ 371 (c)(1),
(2) Date: Sep. 9, 2021

(87) PCT Pub. No.: WO2020/183289
PCT Pub. Date: Sep. 17, 2020

(65) Prior Publication Data
US 2022/0042679 A1     Feb. 10, 2022

(30) Foreign Application Priority Data

Mar. 11, 2019 (IT) .................. 102019000003507

(51) Int. Cl.
*F23D 14/72*     (2006.01)
*F23N 5/10*     (2006.01)
(Continued)

(52) U.S. Cl.
CPC ............ *F23D 14/725* (2013.01); *F23N 5/10* (2013.01); *G01K 1/143* (2013.01); *G01K 7/04* (2013.01);
(Continued)

(58) Field of Classification Search
CPC ........... F23D 14/725; F23D 2203/1012; F23D 2208/10; F23D 2209/20; F23N 5/10;
(Continued)

(56) References Cited

U.S. PATENT DOCUMENTS 3,867,205 A * 2/1975 Schley ...................... G01K 7/04
                                                              136/202
4,416,553 A * 11/1983 Huebscher ............... G01K 1/16
                                                               374/165

(Continued)

FOREIGN PATENT DOCUMENTS

EP           0525557 A1     2/1993
EP           2330346 A2     6/2011

*Primary Examiner* — David J Laux
(74) *Attorney, Agent, or Firm* — Dickinson Wright PLLC; Andrew D. Dorisio

(57) ABSTRACT

A temperature sensor (1) for gas burner (2) having a thermocouple (11) comprising electric conductors (15) and a connection element (12) to connect to the burner (2) associated with a free end (18) of such thermocouple (11), said connection element (12) being suitable for being inserted inside a seat of the sensor (8) formed inside a wall (4) of the burner (2) and having a first end (26) suitable for being placed at the outer surface (6) of the burner (2), said thermocouple (11) being inserted inside a blind hole (29) of the connection element (12) which opens at a second end (28) of said connection element (12). Said blind hole (29) ends with at least one part (31) convergent towards an end zone (K) of the hole (29), said part (31) getting in contact with the thermocouple (11) inserted inside the connection element, the connection element (12) being made from an iron-chrome-aluminum alloy. An assembly comprising such temperature sensor and a burner is also claimed.

11 Claims, 5 Drawing Sheets

(51) Int. Cl.
  *G01K 1/143* (2021.01)
  *G01K 7/04* (2006.01)
  *G01K 1/16* (2006.01)

(52) U.S. Cl.
  CPC .. *F23D 2203/1012* (2013.01); *F23D 2208/10* (2013.01); *F23D 2209/20* (2013.01); *F23N 2225/16* (2020.01); *F23N 2900/05005* (2013.01); *G01K 1/16* (2013.01)

(58) Field of Classification Search
  CPC ...... F23N 2225/16; F23N 2900/05005; G01K 1/143; G01K 7/04; G01K 1/16
  See application file for complete search history.

(56) References Cited

U.S. PATENT DOCUMENTS

| | | | | |
|---|---|---|---|---|
| 4,527,005 | A * | 7/1985 | McKelvey | G01K 7/04 |
| | | | | 374/E1.018 |
| 5,999,081 | A * | 12/1999 | Hannigan | G01K 1/16 |
| | | | | 374/185 |
| 2002/0179136 | A1* | 12/2002 | Starer | G01K 7/04 |
| | | | | 337/204 |
| 2018/0045581 | A1* | 2/2018 | Goda | G01K 1/08 |
| 2018/0136050 | A1* | 5/2018 | Lanzani | G01K 3/14 |
| 2021/0077971 | A1* | 3/2021 | Cadalen | G01K 1/14 |

\* cited by examiner

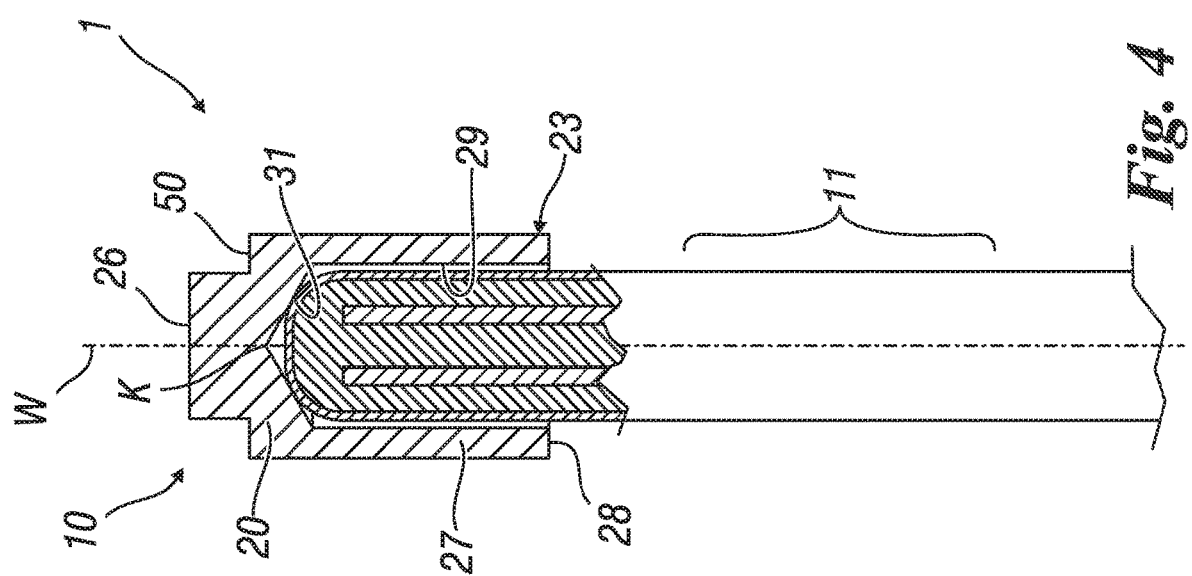

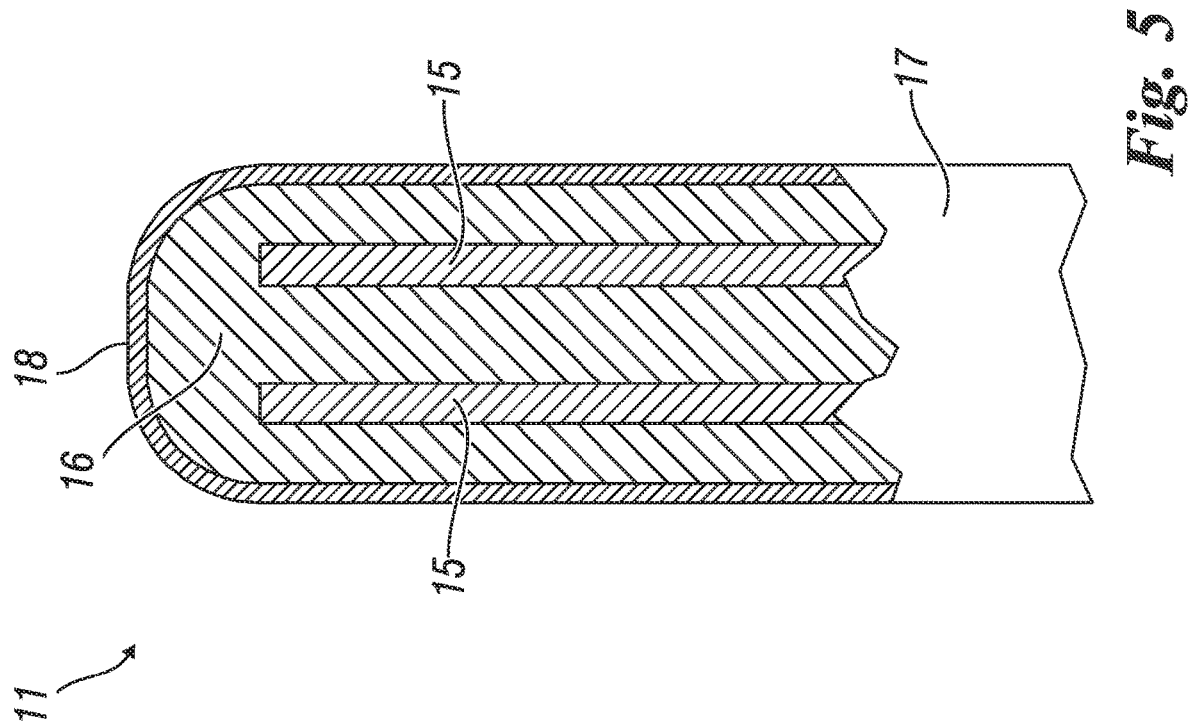

TEMPERATURE SENSOR FOR GAS BURNER AND ASSEMBLY CONSISTING OF SUCH SENSOR AND BURNER

TECHNICAL FIELD

The object of the present invention is both a temperature sensor for gas burner and an assembly consisting of a gas burner and such sensor, according to the preamble of their corresponding independent claims.

BACKGROUND

As indicated above, the present invention relates to a temperature sensor suitable for assessing the temperature of the surface of a gas burner on which the flame is generated. This is both for safety reasons such as assessing the presence of the flame or assessing abnormal combustion conditions in order to adequately control the feeding of the air-gas mixture to the burner and for obtaining an operation of the burner as required by the user. Also, such sensor makes it possible for the burner to operate within envisaged optimal limits from the point of view of the rules on pollution. The burner is a burner for domestic, commercial, or industrial applications and it is provided with such temperature sensor.

Several modes for measuring the burner temperature are known, but all these solutions feature technical drawbacks that reduce applicability, performances, and reliability thereof. Such drawbacks are determined both by the physical-chemical conditions wherein the burner-temperature sensor assembly and/or the only temperature sensor (comprising a thermocouple having electric conductors) operate, and by the technologic difficulties bound to the manufacturing process of the sensor-burner assembly.

According to one of such solutions the electric conductors of the sensor are directly welded to the burner surface. However, the process for welding the sensor to the burner is very difficult, because the materials which constitute the sensor (for instance, Chromel and Alumel for a thermocouple of widespread use, or referred to as K type) are often little compatible with the materials constituting the burner (for instance, stainless steel). Consequently, in the junction zone between the parts hard and fragile intermetallic compounds may be formed that do not foster the welding uniformity and hence jeopardize the mechanical characteristics thereof.

Moreover, reliability and performances are influenced by the high temperatures reached by the sensitive element of the sensor (which might reach and exceed 900° C.), by the thermal gradients between the different parts of the sensor-burner assembly at temperature steady-state, by the thermal transients of the assembly itself subject to the operating modes of the application which it is part of.

Add to this that the substances which the system or sensor-burner assembly can get in contact with are mainly air, gaseous fuel, and combustion products. As an example, during some operating steps the contact with water vapor or with liquid-state water cooperates to emphasize the oxidation of the metals and consequently the functional deterioration of the system. Such deterioration can concern the mechanical characteristics of the part components of the system, an alteration of the chemical composition of the parts with a consequent modification of the read signal, or other known drawbacks.

Therefore, the known solution of welding the electric conductors of the temperature sensor on the burner surface is subject to all the above-mentioned problems, problems that might determine an alteration of the temperature signal output from the sensor and a growing tendency to cracks and breakages close to the welding zone. Moreover, in this embodiment, the positioning accuracy of the thermocouple defining the temperature sensor is limited, which affects the repeatability and quality of the read signal.

EP2330346 discloses a different manner to secure a temperature sensor or thermocouple to a burner. According to EP2330346, the thermocouple is associated with a metal element or head arranged at the free end of the thermocouple; such head has a front end suitable for being arranged into the environment the temperature of which is desired to measure (burner surface) and a rear side having a seat wherein the thermocouple is installed. The head has, in correspondence with such seat and within a closed side thereof, end of said seat, two holes suitable for housing the two conductors of the thermocouple projecting from the terminal end of the thermocouple itself. This circumstance allows to put such conductors in direct contact with the head in such a way as to directly assess the temperature assessed by the head itself when it is inserted, from the internal side of the burner (usually having a cylindrical or a curved plate shape), in an appropriate seat (i.e. a through hole) formed in the burner part.

According to this solution the coupling between thermocouple and burner is simpler and easier, and the temperature sensor in its whole (comprising thermocouple and metallic head) can be arranged in such a way as to effectively assess the burner temperature. However, the operation of inserting the metallic conductors (the cross section of which is very small) within the holes of the head is an operation not easy to perform, requires very careful attention, and it might also be a source of error in reading the temperature by the sensor should such insertion be made in an erroneous or partial way. It follows that the known solution has disadvantages not only from an economic but also from a constructional point of view.

Add to this that EP2330346 discloses that the above-mentioned metallic head is made from the same material as the burner surface; the latter affects the resistance to thermal fatigue which the head itself is subjected to, its weldability to the burner, and also affects its compatibility with the material (for instance, Inconel®) which the stem of the thermocouple is made from.

Thermocouple sensor of a type in which the conductors are incapsulated within a protective element (such as one or more tubular metallic sheaths or a braid protection) and dipped into an insulating material (typically magnesium oxide) are known.

This solution prevents the conductors of the thermocouple from being directly welded to the burner surface, prevents the conductors themselves from being directly exposed to the environment wherein the thermocouple operates, and devolves the structural function to the external protective element. However, in this event too, numerous drawbacks arise should this kind of thermocouple be desired to be applied to a burner.

First of all, the shape of this kind of sensor is cylindrical in length and spheroidal in its end part; consequently, the sensor or its end part cannot be inserted inside a hole formed in the sheet of the burner in an accuracy and repetitive manner. In addition, also in this case, if the protective element of the thermocouple has to be welded to the burner sheet metal, problems of weldability arise because the material of which they are composed are not compatible and not effectively weldable (for instance, in the case, very frequent, of a sheath-shape protective element made from Inconel® and a burner made from stainless steel). As a matter of fact, said materials which form the thermocouple and the burner are different from each other in that the elements are subjected to different physical/chemical stresses and also their functions are different.

Finally, the thickness of the protective element of the thermocouple is usually very thin (for instance, less than 1 mm, frequently less than 0.5 mm), consequently the welding of such element is very difficult to perform and there is a concrete possibility that during the welding operations (made by a laser system or by using other technologies) it will be perforated.

U.S. Pat. No. 5,999,081 discloses a temperature measuring system comprising a resistance temperature sensor (also referred to as RTD or resistance temperature detector), a device alternative to a thermocouple intended to measure the temperature of a body; such RTD is a device capable of outputting more accurate measurements in comparison with a thermocouple, even though usually in slower times.

It is envisaged that the casing wherein the RTD is placed (secured to the casing by way of ceramic cement) is externally threaded for being mounted in a hole of the body the temperature of which is desired to measure.

The type of the temperature sensor according to U.S. Pat. No. 5,999,081 is completely different with respect to that of the temperature sensor disclosed in EP2330346. That is why the metallic head disclosed in EP2330346 cannot be used in U.S. Pat. No. 5,999,081 because the temperature sensitive element according this invention is entirely inside the temperature sensor casing and it cannot be inserted in a hole of the head described in EP2330346. It follows that said temperature-sensitive element would not be capable of directly assessing the "felt" temperature by said head when it is inserted in the burner seat.

The type of the temperature sensor according to U.S. Pat. No. 5,999,081 is different to that of the thermocouple described in EP2330346 and the use of the head described in this latter text above said temperature sensor would not guarantee a correct and accurate measurement of the burner temperature.

In addition, the temperature sensor according to U.S. Pat. No. 5,999,081 operates up to a maximum temperature of 300° C., temperature which is well below that which is achieved on the burner surface. Therefore, the solution of the U.S. patent is not suitable for being used in a burner.

SUMMARY

An object of the present invention is to offer a temperature sensor that overcomes the drawbacks of the known sensors when it is applied to a gas burner.

In particular, an object of the invention is to offer a temperature sensor which makes possible a high positioning repeatability, a high signal-reading and structural-function reliability and durability, as well as the absence of problems bound to material compatibility and weldability.

Another object is to offer a temperature sensor to be used for assessing the temperature of a burner capable of reducing the problems present during the sensor welding/assembling step.

These objects and others which will be apparent to those skilled in the art are achieved by a temperature sensor according to claim 1.

An object of the invention is also to offer an assembly consisting of a temperature sensor and a burner which features fast assembling, safety use, high durability, and high measurement repeatability (repeatability both over time and between different elements of the same manufacturing process), and which provides an optimum control of the burner in order to keep it within the operative limits in accordance with the rules on pollution.

Another object is to offer an assembly consisting of a temperature sensor and a burner wherein such sensor is capable of optimally performing its function as a control and safety device for the burner operation.

These objects and even others which will be apparent for those skilled in the art are achieved by an assembly consisting of a temperature sensor and a burner according to the corresponding independent claim.

BRIEF DESCRIPTION OF THE DRAWINGS

In order to make the present invention better understandable, the following drawings are attached hereto for merely exemplary, non-limitative purposes, in which:

FIG. 4 shows an enlarged view of the end of the temperature sensor depicted in FIG. 2; and FIG. 5 shows a cross sectional view of the end part of a thermocouple defining a portion of the temperature sensor according to the invention.

DETAILED DESCRIPTION

Figure 1:
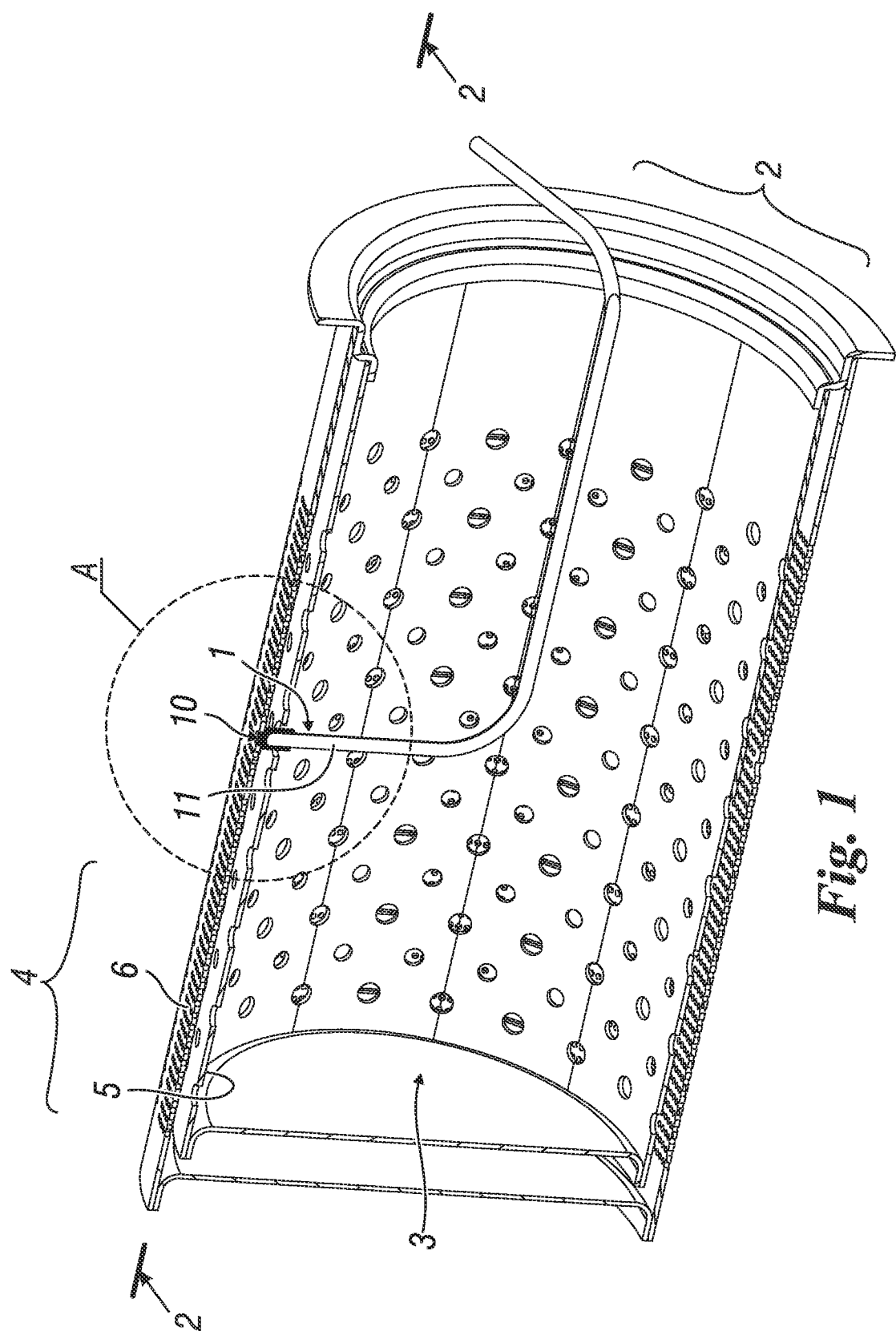
FIG. 1 is a partially cross-sectional view of a system comprising a temperature sensor and a burner according to the invention.
Figure 2:
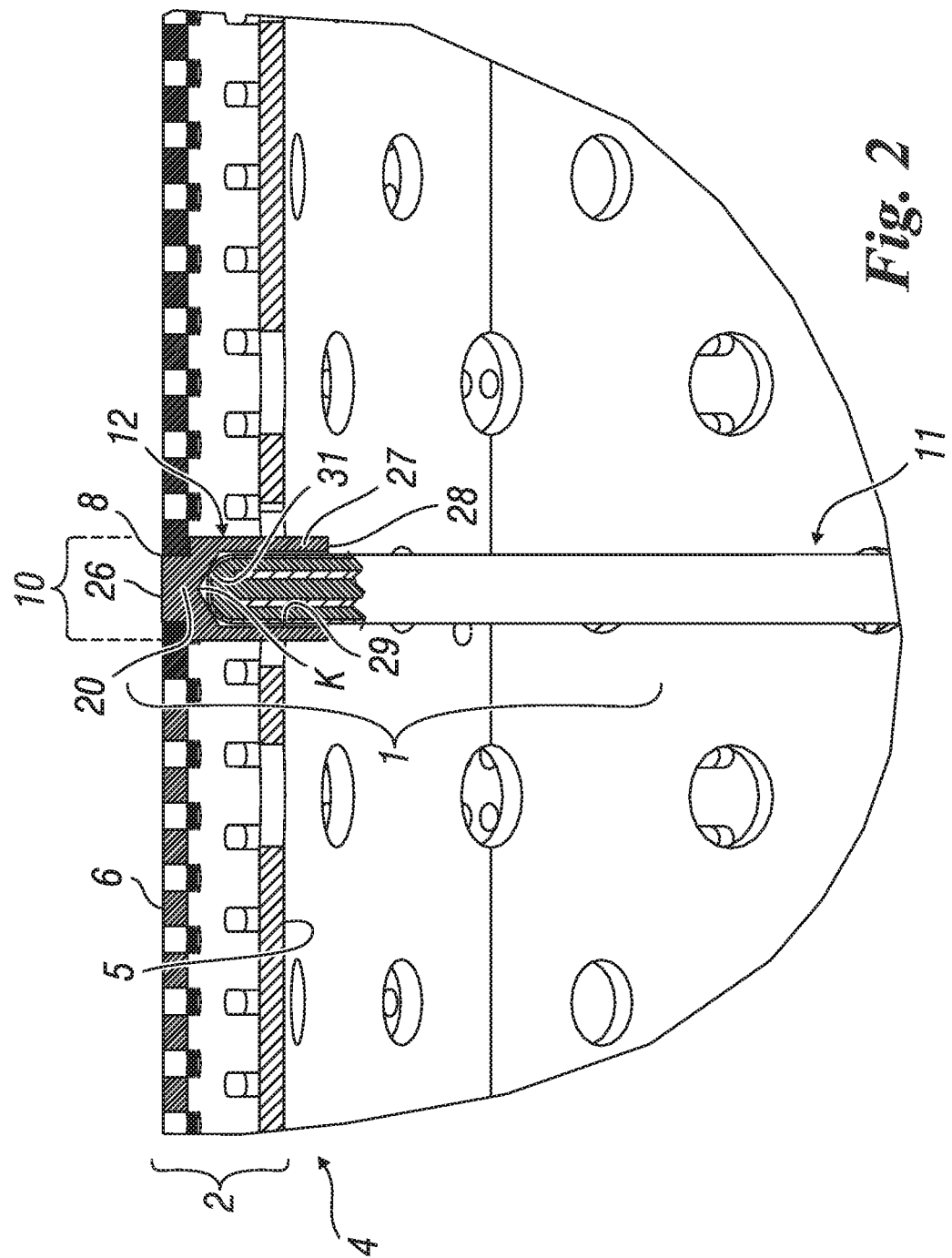
FIG. 2 is a partial, enlarged view of the part identified by A in FIG. 1.
Figure 3:
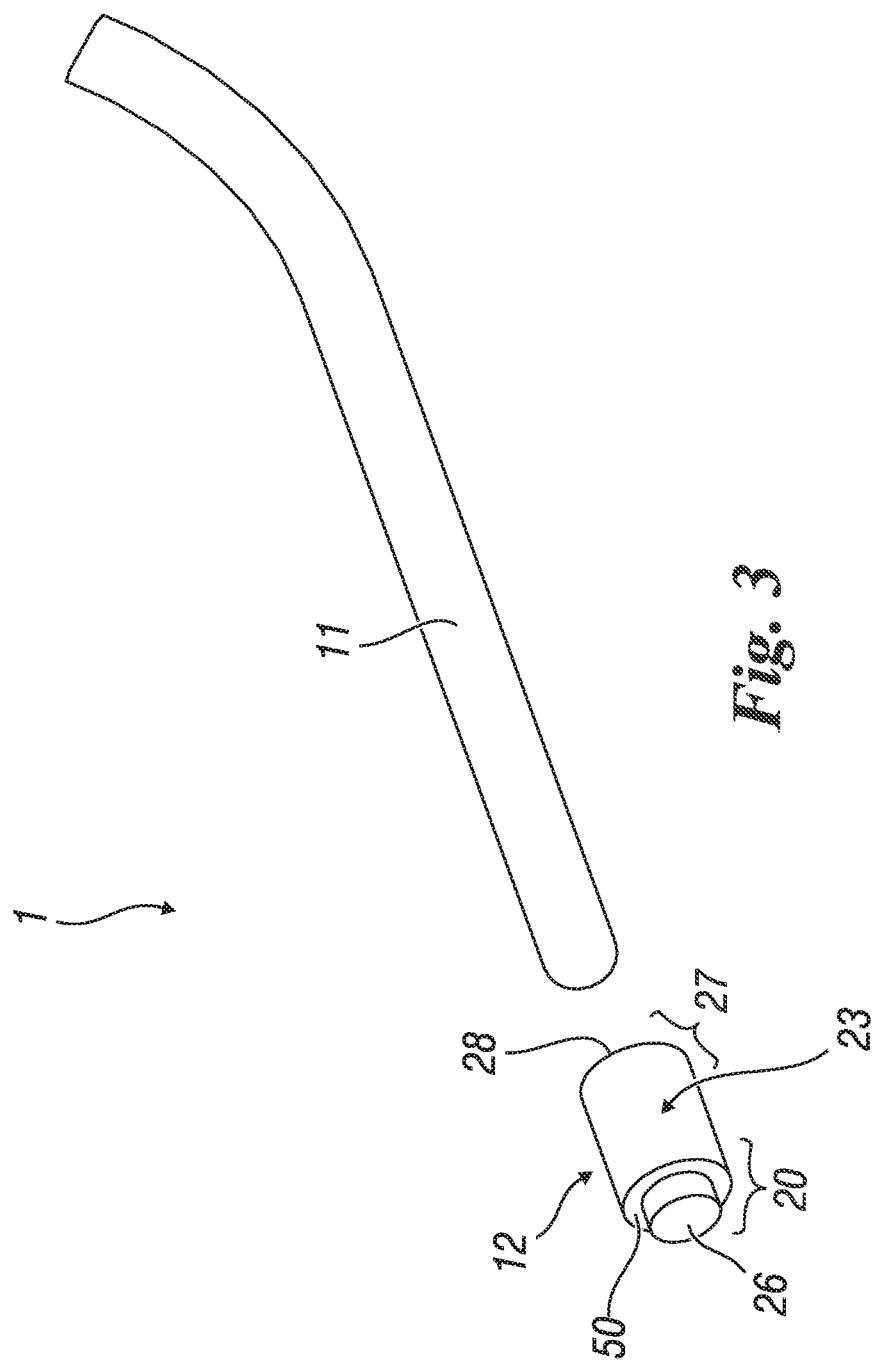
FIG. 3 shows a perspective exploded view of the temperature sensor according to the invention.

With reference to the above-mentioned figures, a temperature sensor is generally indicated with reference numeral 1 and it is associated with a burner 2 that, by way of non-limiting example, has a cylindrical shape. This burner has an inner cavity or part 3 internally to which the sensor 1 is inserted, a (double) wall 4 having, in the embodiment shown in the figures, an inner portion 5 and an outer portion 6 reciprocally spaced from each other; the flame forms downstream of the portion 6 when, in a known manner, the burner is fed by an air-gas mixture. It goes without saying that the wall 4 may also be single and have one portion only.

The burner has a seat 8 inside its wall 4 suitable for holding the end part 10 of the temperature sensor. The latter can be defined by a thermocouple, by a thermistor or an equivalent temperature transducer device. In the present document, the transducer device will always be identified, for the sake of simplicity, by the term "thermocouple", term that, in any case, is to be understood in its widest form comprising every equivalent temperature transducer device.

Therefore, the temperature sensor 1 comprises the thermocouple 11 and a connection element 12 placed at the end part 10 of the temperature sensor 1 and suitable for being inserted in the seat 8 of the wall 4 of the burner so as to constrain the sensor 1 to the latter.

The thermocouple 11 comprises two metallic conductors 15 spaced away from each other by a mineral oxide 16, everything enveloped by a protective element defined, in the example of the figures, by a known metallic protective sheath 17. Said conductors can be welded to a head or free end 18 of the thermocouple 11 thus manufacturing the so-called ground-junction thermocouple, or can be welded to each other without any contact with said head 18, thus manufacturing the so-called insulated junction thermocouple.

The thermocouple head 18 is inserted into the connection element. This connection element 12 is conveniently shaped and may feature any shape suitable for properly cooperating with the wall 4 (i.e. a cylindrical, elliptical, square or other shape). Thus, the element 12 is suitable for holding the thermocouple 11 and interfacing it with the outer portion 6 of the burner.

The element 12 includes a first portion 20 shaped in such a way as to interface by interference fitting the wall 4 of the burner 2 centering it in the seat 8 formed therein (shown in the figures as a through hole) and at the same time providing a correct and precise positioning of the sensor in the axial direction.

More specifically, the element 12 includes a body 23 having a first end 26 suitable for being arranged coplanar to the outer surface 6 of the wall 4 of the burner, such end 26 being of its own of the portion 20. The body 23 comprises a second portion 27 featuring a length sufficient to correctly couple itself with the thermocouple 11, without excessively incrementing the thermal mass (and consequently inertia) and without implying an excessive cost. For example, the axial length of the element for a thermocouple having a diameter of 2 mm was defined to be 3 mm. This length of the portion 27 is probably in the range from approximately 0.70 to 2.30 times the thermocouple diameter. The portion 27 ends at a second end 28 of the body itself where a seat or blind hole 29 opens which is suitable for receiving the head 18 of the thermocouple 11.

The connection element 12, and hence the whole sensor 1, can be secured to the wall 4 by way of a welding operation (conveniently, but not exclusively of a laser technology) or another manner (soldering, mechanical deformation, and so on). The connection element 12 can be conveniently secured to the thermocouple 11 by way of mechanical deformation, but also by way of welding, soldering or another mode. It is also possible to simultaneously use several anchoring methods (for instance, mechanical deformation together with laser spot welding).

Therefore, the element 12 has a cylindrical shape in the tubular and hollow portion 27; such portion proceeds with the also cylindrical portion 20 whose cross section (or diameter) is lower than that of the portion 27, so as to create a step 50 suitable for stopping the insertion of the element 12 into the seat 8 of the wall 4 of the burner. It goes without saying that the length of the portion 20 with respect to the portion 27 is subjected to the seat 8.

The seat 29 for the thermocouple is a blind one and, in the embodiment depicted in the figures, ends in correspondence with the body 23 with at least one end part 31 convergent or angulated towards a longitudinal axis W of the thermocouple. This part might have a truncated cone or cone, pyramidal, spheroidal, or other shape, with several faces convergent to a single point or end zone K. The conicity of said part 31 (i.e. the inclination or angle formed by the walls of the part 31 convergent to the zone or point K, or to the longitudinal axis W of the sensor 1) ranges from 0° to 75° and makes it possible for the head 18 of the thermocouple to contact, hence laterally to rest on at least one portion of such part 31 and to rest along the remaining wall of the seat 29 of the second portion 27 of the element 12, thus creating a wide zone of thermal exchange with said connection element 12 and preventing the metallic conductors 15 from being directly inserted and connected to the element 12 itself. This facilitates the assembling of the sensor 1 (i.e. the thermocouple 11 and the element 12) and provides an optimum transferring of the hot, through the connection element, from the burner to the conductors 15 of the thermocouple 11, thus increasing the reliability over time of the whole sensor 1 and consequently the accuracy in measuring the temperature of the wall 4 of the burner 2.

In one variant of this embodiment, the seat 29 can have an end part 31 featuring a different shape: for example, it can be divergent with respect to the axis W and with a brazing material or with a concavity opposed to that shown in the figures.

In one further variant of this embodiment, the configuration of the seat 29 of the element 12 and that of the head 18 of the thermocouple might even not perfectly match on a wide surface (annular of said seat); this also as a consequence of the method for manufacturing the sensor 1. As a matter of fact, during the manufacturing step, the connection element 12 receives the thermocouple 11 and is secured to it by way of any of the already described methods; the outer wall of said element 12 is also possibly subjected to mechanical stress in radial direction ("hammering") so as to obtain an interference fit between the outer surface of the thermocouple 18 and the seat 29.

Therefore, because of the reasons explained above, the contact between the thermocouple and the connection element might be discontinuous. Anyhow, irrespective of such contact being discontinuous or continuous, in the present text the cooperation between said parts will always be generically referred to as "contact" ("to contact" or "by contacting").

In one embodiment, particularly suitable for applying one-sheath thermocouples 11 made from Inconel® (or nickel-chrome-aluminum-based alloys) to cylindrical burners of a premixed type made from stainless steel (for instance, ferritic, of ferritic added with aluminum or any Fe—Cr—Al alloys), the connection element 12 has the above-described geometric characteristics and is advantageously manufactured from Kanthal® D (or another iron-chrome-aluminum alloy).

The presence of the connection element 12 in said material, featuring the shape and the dimensions conveniently selected, reduces or zeroes the problems of compatibility amongst materials, reduce the amount of the differential expansions, makes the welding operation for welding the sensor 1 to the wall 4 of the burner possible, without deteriorating the sheath 17 of the thermocouple 11. Surprisingly, such shape and dimensions make it also possible to prevent the thermocouple sheath from being perforated, as demonstrated by the test carried out by the applicant. This problem has not been dealt with by the previous above-mentioned tests both because they do not describe sensors wherein parts are welded to each other (see U.S. Pat. No. 5,999,081) and because the sensor is however constructively very different from that according to the present invention.

Also, the choice of the material made up of an iron-chrome-aluminum alloy (for instance, Kanthal®), has been experimentally tested and verified as optimum for manufacturing a valuable temperature sensor suitable for assessing high values of said temperature, even above 900° C. Said material provides an optimum characteristic of weldability (when carried out) of the materials involved in the manufacturing step of the sensor 1, and of oxidation resistance and mechanical fatigue during the use of such sensor. In other words, the use of said alloy (for instance, Kanthal®) improves the sensor reliability over time, preventing it from suffering cracks, deteriorations, and its resultant breakages.

An embodiment has been described wherein the sensor 1 is associated with a cylindrical burner. Obviously, such burner can feature other shapes such as, for instance, a flat shape, and the thermocouple 11 (or temperature transductor device) might have every conductor 15 coated with its own sheath or with a protective element, or even with a (metallic or not metallic) braid protection. As a matter of fact, the invention is suitable for any application where there is the need for guaranteeing reliability and durability upon measuring high temperatures and/or high temperature changes in reduced times, in particular on metallic bodies of gas burners.

The invention claimed is:

1. A temperature sensor (1) for gas burner (2) having a temperature transducer device (11) comprising electric conductors (15) and a connection element (12) to be connected to the burner (2) associated with a free end (18) of such temperature transducer device (11), said connection element (12) being suitable for being inserted into a seat of the sensor (8) formed inside a wall (4) of the burner (2) and having a first end (26) suitable for being positioned at the outer surface (6) of the burner (2), said temperature transducer device (11) being inserted inside a blind hole (29) of the connection element (12) which opens at a second end (28) of such connection element (12), characterized in that the electric conductors are entirely inserted into the temperature transducer device (11) and are arranged away from said connection element (12), said blind hole (29) ending with at least a part (31) having an inclined wall suitable for getting in contact with the temperature transducer device (11) inserted into the connection element, the connection element (12) being made from an iron-chrome-aluminum alloy.

2. The temperature sensor according to claim 1, characterized in that the end part (31) of the hole (29) features a cone, truncated cone, pyramidal or spheroidal shape.

3. The temperature sensor according to claim 1, characterized in that the end part converges towards an end zone (K), the wall of such end part (31) defining an angle ranging from 0° to 75°.

4. The temperature sensor according to claim 1, characterized in that the temperature transducer device is a thermocouple or a thermistor.

5. The temperature sensor according to claim 1, characterized in that the connection element (12) is in contact with a protective element (17) for protecting the electric conductors (15) of said temperature transducer device.

6. The temperature sensor according to claim 1, characterized in that the connection element (12) comprises a body (23) having a first portion (20) including said first end (26) and a second portion (27) whose cross section is greater than that of the first portion (20) and in which said blind hole (29) is formed, the temperature transducer device (11) also getting in contact with the wall of said blind hole which is present inside said second portion (27).

7. The temperature sensor according to claim 6, characterized in that the second portion (27) of the connection element (12) has a length ranging from approximately 0.70 to approximately 2.30 times the diameter of the temperature transducer device (11) that is enough for performing a coupling with said temperature transducer device, said length advantageously ranging from 1.5 to 4.5 mm.

8. The temperature sensor according to claim 6, characterized in that a step (50) is provided between the first portion (20) and the second portion (27) of the connection element (12), by way of which said connection element (12) rests on said wall (4) of the gas burner (2).

9. An assembly comprising a gas burner and a temperature sensor suitable for assessing the temperature of a surface (6) of said burner (2) on which a flame is generated, characterized in that said sensor is according to claim 1.

10. The assembly according to claim 9, characterized in that said burner (2) includes a wall (4) on the surface (6) of which a flame is generated, in said wall (4) being made a through hole which defines a seat (8) for said temperature sensor, the latter being integral with the wall (4) by way of welding, soldering, or mechanical deformation.

11. The assembly according to claim 9, characterized in that the burner is made from stainless steel and the temperature transducer has a sheath made from a nickel-chrome-aluminum-based alloy.

* * * * *